May 12, 1964  C. URBAN  3,132,515
FLUID GAUGE SYSTEM
Filed Nov. 14, 1962
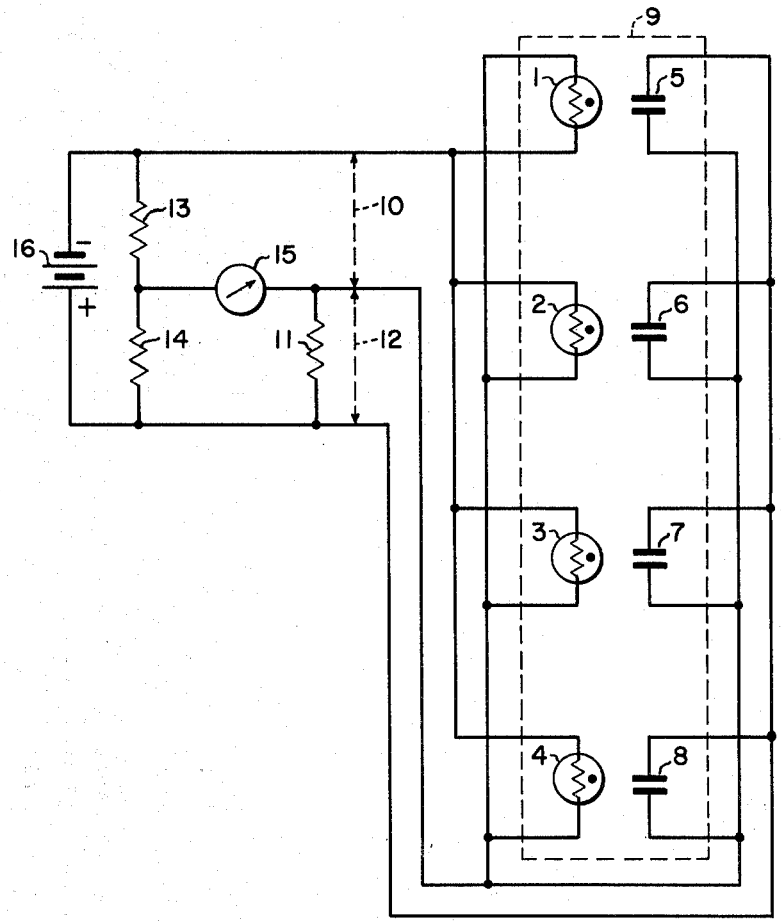
INVENTOR.
BY CHARLES URBAN

United States Patent Office 3,132,515
Patented May 12, 1964

3,132,515
FLUID GAUGE SYSTEM
Charles Urban, Cos Cob, Conn., assignor to Simmonds Precision Products, Inc., Tarrytown, N.Y., a corporation of New York
Filed Nov. 14, 1962, Ser. No. 237,465
8 Claims. (Cl. 73—295)

This invention relates to a fluid gauge system, and more particularly relates to a system for indicating discrete levels of a fluid in a tank.

Fluids can be gauged by normal thermistor techniques provided that the temperature of the fluid is of the order of the normal ambient temperature. However, if the temperature of this fluid is raised then gauging by thermistors is rendered difficult since, as the temperature of the fluid approaches that of the thermistor bulb, the heat from this bulb is not readily dissipated and thus the resistance of the thermistor does not vary greatly.

Further, certain fluids, such as synthetic oils, have a low specific heat, and thus the response of such a system is slow.

However, many of these fluids possess the property that their electrical conductivity varies substantially when the fluid is raised to elevated temperatures, for example of the order of 300° Fahrenheit.

One object of the invention is to utilise this property in gauging the level of the fluid.

It is a further object of this invention to provide a discrete level gauging system for a fluid the temperature of which may vary over a wide range.

It is a further object of this invention to provide a gauging system including an electrical bridge circuit, the level of fluid within a tank being indicated by means indicating balance and unbalance conditions in said bridge.

It is a further object of this invention to provide a fluid gauging system including both thermistors and plate-type sensors disposed in a tank containing said fluid.

It is a further object of this invention to provide a fluid gauging system in which the level of fluid in a tank is indicated in discrete steps by a bridge circuit comprising both thermistors and plate type sensors which utilise the variable conductivity characteristic of the fluid being gauged.

For a better understanding of this invention as well as other objects and further features thereof, reference will now be made to the following description to be read in conjunction with the accompanying drawing in which:

FIGURE 1 illustrates a schematic diagram of a system according to the invention for gauging in discrete steps the level of a fluid in a tank.

Referring now to the drawing two juxtaposed sets of thermistors 1–4 and sensor plates 5–8 are vertically disposed in a tank 9.

The thermistors are connected in parallel in one arm 10 of a four arm bridge circuit and the sensor plates are also connected in parallel, together with a resistor 11, in another arm 12 of the bridge circuit. The two other arms of the bridge circuit are provided by resistors 13 and 14, respectively. A meter 15 is connected across one diagonal of the bridge and a unidirectional power supply 16 is connected across the other diagonal of the bridge.

It will be assumed that the fluid (not shown) in the tank is a synthetic oil, e.g. 7808, which is non-conducting at normal ambient temperatures but which increases in conductivity as the temperature thereof is raised for example to the order of 300° Fahrenheit.

When the oil is at the normal ambient temperature and fills the tank, the resistances of all the thermistors 1 to 4 are substantially the same, and it will be assumed that these parallel resistances together define a value equal to that of the resistor 13. Since the oil is at the normal ambient temperature it is non-conductive and thus the resistance of the resistor 11 is unaffected by the parallel connected sensor plates 5 to 8. The resistances of the two resistors 11 and 14 are the same and thus with the tank full, there is no current flowing through the meter 15, which in this condition indicates that the tank is full.

As the oil drops below the level of each of the thermistors in turn, the total value of the parallel resistances of these thermistors progressively drops causing the potential at the junction between the resistor 14 and the thermistors to rise whereby the bridge is unbalanced and current flows through the meter in one direction and provides an indication of the change of level of the fluid.

When the oil rises to a temperature such that the thermistors are rendered ineffective as variable resistors and the conductivity of the oil is such that a finite resistance is manifested across the sensor plates 5–8, then as the oil drops below the level of each of the sensor plates in turn the total value of the parallel resistances of these plates, together with the resistor 11, progressively rises. Thus the potential at the aforesaid junction rises, as was the case when the thermistors were effective, whereby the bridge is unbalanced and current flows through the indicator means 15 in the said one direction again providing an indication of the change of level of the fluid.

At intermediate temperatures of the oil when the thermistors are still effective and the oil exhibits a finite conductivity, then the arms 10 and 12 of the bridge are both effective to cause the potential at the aforesaid junction to rise as the oil successively uncovers the thermistors and sensor plates.

With the system illustrated. when the oil is above the level at which the thermistor 1 and the sensor plate 5 is located the indicator means 15 registers "full," and when the oil drops below this level the indicator means registers "¾." As the oil successively drops below the levels at which the thermistors 2, 3, 4 and sensor plates 6, 7, 8 are respectively located, then the indicator means registers "½," "¼" and "0" in discrete steps.

The system described is of particular utility in asymmetrically-shaped tanks in which a change in the level of the oil therein is not proportional to a change in the quantity of oil. In the system described such disproportionality can be taken into account merely by selection of the relative spacing between adjacent ones of the thermistors and adjacent ones of the sensor plates.

Although there has been shown what is considered to be the preferred embodiment of the invention, it will be evident that many changes and modifications can be made without departing from the essential spirit of the invention. For example, there need be provided only one thermistor and one sensor plate in the tank located at a particular level therein with regard to which an indication of fluid content is required. Thus, if such a thermistor and sensor plate were to be located adjacent to the bottom of the tank then an indication would be provided when the fluid had dropped to a dangerously low level. It is intended, therefore, in the annexed claims, to cover all such changes and modifications as fall within the scope of the invention.

I claim:
1. In a system or gauging the level of fluid in a container the conductivity of said fluid varying with temperature,
   a source of electrical supply,
   an electrical bridge circuit connected to said source of supply and having
   at least one first sensing device connected in one arm of the bridge and located in said container at a predetermined level, said first device exhibiting a change in resistance with a change in the proximity thereto of said fluid, said resistance change being greater the lower is the temperature of said fluid, at least one second sensing device connected in another arm of the bridge circuit and located at said predetermined level, said second device exhibiting a change in resistance with a change in the proximity thereto of said fluid, said resistance change being greater the higher the temperature of said fluid, and an indicator means connected in said bridge circuit for indicating balance and unbalance conditions in said bridge, said conditions being dependent on the resistances exhibited by said sensing devices.

2. A system as claimed in claim 1, said first sensing device comprising a plurality of first sensing devices vertically disposed at different levels in said container and connected in parallel with each other, and a like plurality of second sensing devices vertically disposed at said different levels in said container and connected in parallel with each other.

3. A system as claimed in claim 2, wherein said second sensing devices are conductive plates spaced from each other and bridged by said fluid on immersion therein, and wherein said first sensing devices are thermistors.

4. A system for gauging the level in a container of a fluid the conductivity of which increases with increases in temperature and which is non-conductive at normal ambient temperatures, comprising
a source of electrical supply,
an electrical bridge circuit connected to said source of supply and having
at least one first sensing device connected in one arm of the bridge and located in said container at a predetermined level, said first device exhibiting a change in resistance on immersion in said fluid, said resistance change being greater the lower is the temperature of said fluid,
a resistor connected in another arm of the bridge circuit,
at least one second sensing device connected in parallel with said resistor and located at said predetermined level, said second device exhibiting an infinite resistance when said fluid is at the normal ambient temperature and a finite resistance on immersion in said fluid at temperatures higher than the normal ambient temperature, the magnitude of said finite resistance being greater the higher is the temperature of the fluid, and
an indicator means connected in said bridge circuit for indicating balance and unbalance conditions in said bridge, said conditions being dependent on the resistances exhibited by said sensing devices.

5. In a discrete point gauging system for fluid in a container, the conductivity of the fluid being temperature dependent,
a source of electrical supply,
an electrical bridge circuit connected to said source of supply and having,
at least one thermally-sensitive resistor connected in one arm of the bridge circuit and located in said container at a predetermined level, said resistor exhibiting a change in resistance on immersion in said fluid, the said change respectively varying from a finite to an infinitely small value with a change of said fluid from a first temperature to a second temperature,
at least one fluid conductivity sensor connected in another arm of the bridge circuit and located in the container at the said predetermined level, said sensor exhibiting a change in resistance on immersion in said fluid, the said change respectively varying from an infinitely small to a finite value with a change of said fluid from said first temperature to said second temperature, and
an electrical meter connected in said bridge for measuring current flow, said current flow being dependent on the resistance values exhibited by said thermally sensitive resistor and said fluid conductivity sensor and indicative of the level of fluid in said container in relation to said predetermined level.

6. In a discrete point system as claimed in claim 5,
a plurality of said thermally sensitive resistors vertically disposed at different levels in said container and connected in parallel with one another in said one arm of the bridge circuit, and a like plurality of said fluid conductivity sensors vertically disposed at said different levels in the container and connected in parallel with one another in said other arm of the bridge circuit, the said meter being calibrated to indicate any one of the plurality of different levels in dependence on the resistance values of the resistors and sensors.

7. In a discrete point gauging system as claimed in claim 6,
a standard resistor connected in said other arm of the bridge circuit in parallel with the conductivity sensors, the resistance exhibited by said sensors being infinitely large when they lie above the level of said fluid and when immersed in the fluid at the said first temperature.

8. A system for gauging in discrete points the level of a liquid fuel in a tank, the conductivity of the fuel increasing with an increase in temperature and being non-conductive at normal ambient temperatures; comprising
a source of direct current,
an electrical bridge circuit connected to said source and having first, second, third and fourth arms,
a plurality of thermistors connected in the first arm of the bridge and vertically disposed at different levels in said tank and connected in parallel with each other, said thermistors exhibiting a change in resistance on immersion in said fluid, said resistance change being greater the lower is the temperature of the fluid,
a resistor connected in the second arm of the bridge,
a like plurality of fluid conductivity sensors connected in parallel with both said resistor and with each other and vertically disposed in the tank at said different levels said sensors exhibiting an infinite resistance when the fluid in at the normal ambient temperature and a finite resistance on immersion in said fluid at temperatures higher than the normal ambient temperature, the magnitude of the said finite resistance being greater the higher is the temperature of the fluid,
an electrical meter connected in said bridge circuit between the junction of the said first and second arms and the junction of the third and fourth arms of the circuit the said meter measuring current flow dependent on the ratio of the resistance values in the first and second arms and the third and fourth arms, and indicative of discrete levels of said fluid corresponding to said predetermined levels.

References Cited in the file of this patent
UNITED STATES PATENTS

| | | |
|---|---|---|
| 2,485,579 | Elliott | Oct. 25, 1949 |
| 2,930,232 | Spears | Mar. 29, 1960 |
| 2,996,915 | Greenwood | Aug. 22, 1961 |
| 3,058,345 | Matras | Oct. 16, 1962 |